US007860881B2

(12) United States Patent
Haselden et al.

(10) Patent No.: US 7,860,881 B2
(45) Date of Patent: Dec. 28, 2010

(54) DATA PARSING WITH ANNOTATED PATTERNS

(75) Inventors: J. Kirk Haselden, Sammamish, WA (US); Sergei Ivanov, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 387 days.

(21) Appl. No.: 11/371,449

(22) Filed: Mar. 9, 2006

(65) Prior Publication Data

US 2007/0214134 A1 Sep. 13, 2007

(51) Int. Cl.
*G06F 7/00* (2006.01)
*G06F 17/30* (2006.01)
*G06F 3/00* (2006.01)

(52) U.S. Cl. ........................................ 707/769; 715/700
(58) Field of Classification Search ........................ None
See application file for complete search history.

(56) References Cited

U.S. PATENT DOCUMENTS

| | | | | |
|---|---|---|---|---|
| 5,510,981 | A * | 4/1996 | Berger et al. | 704/2 |
| 6,016,467 | A * | 1/2000 | Newsted et al. | 704/9 |
| 6,102,969 | A | 8/2000 | Christianson et al. | |
| 6,108,676 | A | 8/2000 | Nakatsuyama | |
| 6,202,064 | B1 | 3/2001 | Julliard | |
| 6,493,713 | B1 | 12/2002 | Kanno | |
| 6,496,835 | B2 * | 12/2002 | Liu et al. | 1/1 |
| 6,569,208 | B2 | 5/2003 | Iyer et al. | |
| 6,571,243 | B2 * | 5/2003 | Gupta et al. | 707/6 |
| 6,678,681 | B1 * | 1/2004 | Brin | 707/6 |
| 6,714,939 | B2 * | 3/2004 | Saldanha et al. | 707/102 |
| 6,754,650 | B2 | 6/2004 | Cho et al. | |
| 6,782,505 | B1 | 8/2004 | Miranker et al. | |
| 6,922,810 | B1 | 7/2005 | Trower, II et al. | |
| 6,957,233 | B1 * | 10/2005 | Beezer et al. | 707/200 |
| 6,963,876 | B2 | 11/2005 | Schreiber | |
| 6,987,839 | B1 * | 1/2006 | Lockwood | 379/88.12 |
| 6,990,487 | B2 * | 1/2006 | Akaboshi et al. | 707/6 |
| 7,249,140 | B1 * | 7/2007 | Korenevsky et al. | 707/102 |
| 7,529,746 | B2 * | 5/2009 | Ichiriu et al. | 707/6 |
| 2002/0042794 | A1 | 4/2002 | Konaka | |
| 2002/0156817 | A1 * | 10/2002 | Lemus | 707/531 |
| 2003/0018668 | A1 * | 1/2003 | Britton et al. | 707/513 |

(Continued)

FOREIGN PATENT DOCUMENTS

WO WO0118692 3/2001

OTHER PUBLICATIONS

Ramachandran et al., "An Architecture for Ink Annotations on Web Documents", 2003, ICDAR'03, IEEE.*

(Continued)

*Primary Examiner*—Charles Kim
*Assistant Examiner*—Jeremy D Engelskirchen
(74) *Attorney, Agent, or Firm*—Workman Nydegger

(57) ABSTRACT

The subject disclosure pertains to data parsing with patterns or regular expressions. A mechanism is provided for annotating a regular expression with additional information regarding data extraction such as output fields and mapping of the output fields to sub-sections of matched data. A parser can utilize the annotation information to facilitate mapping and transfer of at least a portion of pattern matched data from a source to a destination. The disclosed systems and methods thus enable data to be exacted while it is being matched.

15 Claims, 15 Drawing Sheets

U.S. PATENT DOCUMENTS

| | | | |
|---|---|---|---|
| 2003/0050782 A1* | 3/2003 | Zweig et al. | 704/270 |
| 2003/0212544 A1* | 11/2003 | Acero et al. | 704/9 |
| 2004/0015909 A1 | 1/2004 | Cho et al. | |
| 2004/0019477 A1 | 1/2004 | Finkelstein | |
| 2004/0073546 A1* | 4/2004 | Forster et al. | 707/4 |
| 2004/0117395 A1 | 6/2004 | Gong et al. | |
| 2004/0187110 A1* | 9/2004 | Boyfield | 718/100 |
| 2004/0225999 A1 | 11/2004 | Nuss | |
| 2004/0243560 A1* | 12/2004 | Broder et al. | 707/3 |
| 2005/0010581 A1 | 1/2005 | Doan | |
| 2005/0060291 A1 | 3/2005 | Kirkland et al. | |
| 2005/0080763 A1 | 4/2005 | Opatowski | |
| 2005/0097514 A1 | 5/2005 | Nuss | |
| 2005/0108227 A1 | 5/2005 | Russell-Falla | |
| 2005/0108267 A1 | 5/2005 | Gibson et al. | |
| 2005/0108630 A1* | 5/2005 | Wasson et al. | 715/513 |
| 2005/0234703 A1 | 10/2005 | Brill | |
| 2005/0251381 A1 | 11/2005 | Pentheroudakis | |
| 2007/0011157 A1 | 1/2007 | Tang | |
| 2007/0027887 A1 | 2/2007 | Baldwin | |
| 2007/0061740 A1 | 3/2007 | Marini | |
| 2007/0130140 A1* | 6/2007 | Cytron et al. | 707/6 |

OTHER PUBLICATIONS

Marwick, Alan., "Text Mining for associations using UIMA and DB2 Intelligent Miner", Feb. 2, 2006, IBM.*

Barnett et al., Regular Expressions and Extended Pattern Matching, 1991, Bruce Barnett & General Electric Company.*

Brown, Stan., GREP—Find Regular Expressions in Files Quick Start for Release 8.0, May 2005, Oak Road Systems.*

Hollenhorst, Jim., "Expresso—A Tool for Building and Testing Regular Expressions", Feb. 21, 2003, found at http://www.codeproject.com/KB/dotnet/expresso.aspx.*

Cho, J., et al.; "A Fast Regular Expression Indexing Engine," (12 pages) Feb. 26, 2002, pp. 419-430, IEEE.

Sunspot; "Henry Spencer's Regexp Engine Revisited," (15 pages), Mar. 6, 2003.

Cassidy, S.; "XQuery as an Annotation Query Language: a Use Case Analysis," Department of Computing, Macquarie University, (7 pages), Proceedings of LREC, 2002.

Piskorski, et al.; A Flexible XML-based Regular Compiler for Creation and Conversion of Linguistic Resources; 6 pages, 2002.

Blackwell; Swyn: A Visual Representation for Regular Expressions; 18 pages, Jul. 11, 2002.

Tablan, et al.; A Unicode-based Environment for Creation and Use of Language Resources; 6 pages, 2002.

OA dated Feb. 2, 2008 for U.S. Appl. No. 11/356,383, 21 pages.

U.S. Appl. No. 11/356,383, Sep. 17, 2008, Office Action.

U.S. Appl. No. 11/356,383, Apr. 1, 2009, Office Action.

U.S. Appl. No. 11/356,383, Nov. 24, 2009, Office Action.

* cited by examiner

DATA PARSING WITH ANNOTATED PATTERNS

CROSS-REFERENCE TO RELATED APPLICATIONS

This application is related to pending U.S. patent application Ser. No. 11/356,383 entitled "VISUAL DESIGN OF ANNOTATED REGULAR EXPRESSION" filed on Feb. 16, 2006. The entirety of the above-noted application is incorporated by reference herein.

BACKGROUND

Regular expressions, or more generally patterns, describe sets of character strings. The pattern determines character strings that belong to the set. Accordingly, patterns can be employed to identify character strings, for example, to select specific strings from a set of character strings. Furthermore, regular expressions are often defined as a context-independent syntax that can represent a wide variety of character sets and character set orderings.

In operation, regular expressions can be employed to search and match data based upon a predefined pattern or set of patterns. As such, patterns employ a specific syntax by which particular characters or strings are selected from a body of text. More specifically, the expressions can consist of constants and operators that denote sets of strings and operations over these sets, respectively. Using the specific syntax of a regular expression or other pattern language, advanced text pattern matching can be performed. The following table lists exemplary regular expression operators and their definitions. The syntax illustrated in the table is frequently employed to establish both simple and complex string pattern identifications.

| Menu Item | Character | Definition |
|---|---|---|
| Any Character | . | Matches any single character. |
| Character in Range | [ ] | Matches any single character from within the bracketed list. Within square brackets, most characters are interpreted literally. |
| Character Not in Range | [^] | Specifies a set of characters not to be matched. |
| Beginning of Line | ^ | Matches the beginning of a line. |
| End of Line | $ | Matches the end of a line. |
| Or | \| | Matches either the regular expression preceding it or the regular expression following it. |
| Group | ( ) | Groups one or more regular expressions to establish a logical regular expression consisting of sub-regular expressions. Used to override the standard precedence of certain operators. |
| 0 or 1 Matches | ? | Specifies that the preceding regular expression is matched 0 or 1 time. |
| 0 or More Matches | * | Specifies that the preceding regular expression is matched 0 or more times. |
| 1 or More Matches | + | Specifies that the preceding regular expression is matched 1 or more times. |
| Exactly n Matches | {n} | Specifies that the preceding regular expression is matched exactly n number of times. |
| At Least n Matches | {n,} | Specifies that the preceding regular expression is matched n or more times. |
| At Most n Matches | {,n} | Specifies that the preceding regular expression is matched n or fewer times. |
| n to m Matches | {n, m} | Specifies that the preceding regular expression is matched a maximum of n times and a minimum of m times. If not specified, m defaults to 0. If n is not specified, the default depends on whether the comma is present. If no comma is present, n defaults to m. If a comma is present, n defaults to a very large number. |
| New Line Character | \n | Matches a new line. |
| Tab Character | \t | Matches a tab character. |

Regular expressions are a useful tool in the data flow field, which pertains to the movement and transformation of data to and amongst storage mediums. At present, structured information is stored in data files of varied formats. The structure of information depends on the format and therefore varies from format to format. The structure is known to the author and is typically documented so that data in that format can be consumed by others. The state of the art in regular expressions allows one to define a regular expression for each such format that will match data units in files of corresponding format. This permits one to ensure that a data unit conforms to a given format and to find beginning and end of data units of a given format.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject innovation pertains to a structured data parsing. It has been recognized that conventional patterns such as regular expressions do not permit extraction of data fields from data until after the data is matched. The subject innovation provides mechanisms to extract data fields while they are being matched to a pattern. This is an advance from being able to match data units to a given format to being able to match data unit to a given format while simultaneously extracting data fields that constitute the data unit. Accordingly, the innovation provides a valuable extension to conventional structured data parsing.

In accordance with an aspect of the subject innovation, a mechanism is provided to define additional information concerning mapping of portions of data to a destination. More specifically, a specified pattern or regular expression can be annotated with information such as a list of output data fields and a mapping of each output data field to at least a portion of the pattern.

According to another aspect of the subject innovation, a pattern extraction system can employ the annotations to facilitate transfer of data to a designated output. To accomplish the forgoing, the extraction system can employ a matching component to pattern match, a mapping component to identify data to be extracted in accordance with an annotation and an output component to facilitate transfer of the data to a target location.

Also provided is an interface to facilitate interaction with the extraction system in accordance with yet another aspect of the subject innovation. For example, an interface is provided that aids in generation of annotated patterns.

In one instance, a visual mechanism (e.g., user interface (UI)) by which a user can design a pattern is disclosed. Because this novel UI provides a graphical interactive mechanism to design pattern as specified by a regular expression, it can be particularly useful to enable a user to develop regular expressions without an understanding of the intricacies of the regular expression syntax.

In another aspect, the innovation provides a UI by which a user can graphically annotate a regular expression thus, mapping the expression to a particular tabulated output, for instance. By way of example, the annotations can be colored, highlighted, font formatted and the like. In operation, the annotations can map a particular portion of a regular expression to a designated portion (e.g., column) of a tabulated output.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
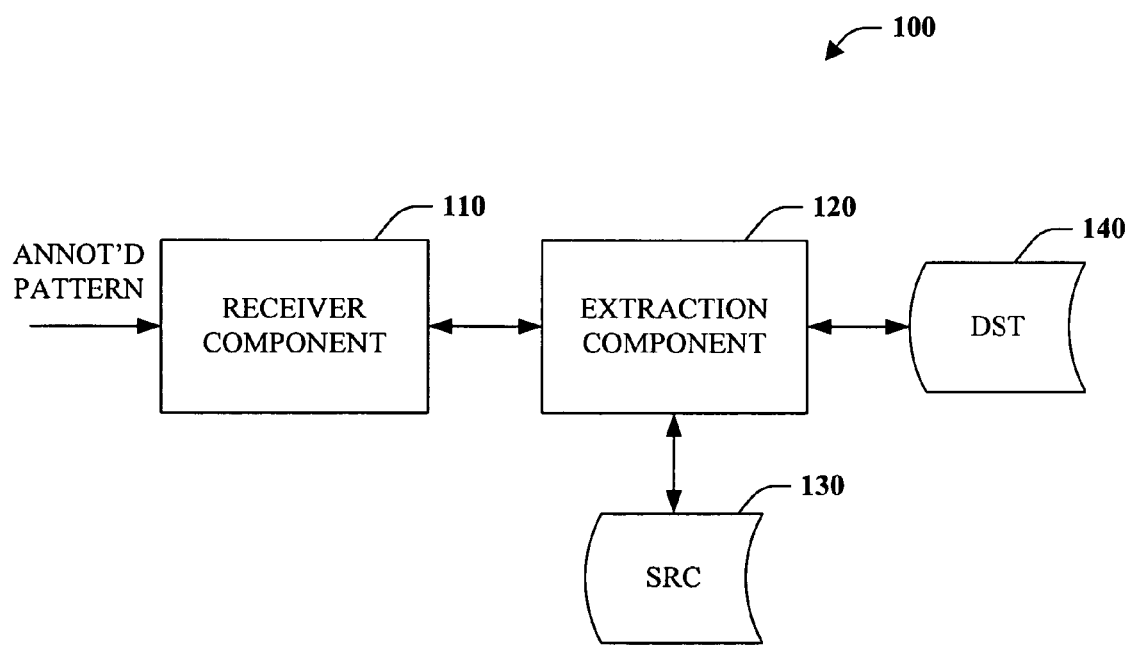
FIG. 1 is a block diagram of a data parsing system.

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

As used herein, the terms "infer," "inference" or variations in form thereof refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus, or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Referring initially to FIG. 1, a data parsing system 100 is illustrated in accordance with an aspect of the subject innovation. The system 100 can be employed for a variety of purposes including but not limited to data flow file parsing. The system 100 includes receiver component 110, extraction component 120, source 130 and destination 140. The receiver component 110 receives, retrieves or otherwise obtains or acquires an annotated pattern and transmits the pattern to, or makes the pattern accessible by, extraction component 120.

As will be described further infra, an annotated pattern is comprised of two main parts: a pattern and an annotation. The pattern is a concise mechanism for identifying both simple and complex patterns of text. Among other things, the pattern can include literal characters (e.g., A, B, C, 1, 2, 3 . . . ) or meta-characters with special meaning (e.g., *-match one or more . . . ). The pattern can be employed by a process that matches text to the specified pattern by checking for the presence of constituents of the pattern. A plurality of different pattern languages can be employed to specify a pattern. For instance, regular expressions can be utilized to construct a pattern for matching. By way of example, a regular expression can be defined as "customer id: *," to match text that includes "customer id:" followed by some other data such as a number.

The annotation is additional information associated with the pattern that pertains to data extraction. For instance, the annotation can define one or more output locations and a mapping of the outputs to at least a portion of the pattern. Such information can be included within the pattern specification, for example separated there from by one or more delimiters (e.g., parentheses, brackets, slashes . . . ).

The extraction component 120 is operable to process a received or retrieved annotated pattern from receiver component 110. More specifically, the extraction component 120 can identify data in source 130 that matches the pattern, extract and persist one or more subsections of the matched data to a destination 140 in accordance with the pattern annotation. The source 130 and destination 140 can both be the same or different computer readable mediums, while the data housed thereon is likely of disparate formats. In accordance with an aspect of the innovation, due at least in part to the pattern annotation, data can be extracted by component 120 substantially simultaneous with or while the data is being matched with the pattern. Thus, the extraction component 120 and therefore system 100 is able to match data units to a given format while extracting portions of data constituting the data unit.

System 100 can be extremely useful with respect to dataflow processing such as those employed to populate data warehouses. As will be appreciated by those of skill in the art, the extraction system 100 can be employed as a component of a larger workflow DTS (Data Transformation Services) or integration service system. Fore example, the source 130 can correspond to a proprietary file such as that associated with a store cash register and the destination can be a data warehouse. The source 130 can be a log file including such things as customer id (e.g., shopping card id), time, date, total amount of transaction as well as information regarding items purchased like SKU, price and number ordered. The problem is one of extracting proprietary formatted data from a log file and saving it to a tabular formatted data warehouse for later analysis. To solve this problem annotated patterns or annotated regular expressions can be developed either manually or automatically to define each record and map portions thereof to particular fields or columns of a data warehouse record. A simplistic exemplary regular expression could be "customer id: * \n." In this case * is a special character, so this expression will match any line in the file that looks like customer id: "some number" followed by a newline This expression can be annotated to denote that data warehouse output column customer id is to be populated from character range 14 to the next character of the expression, here a newline. Assume the file includes customer id:515

The extraction component 515 can retrieve or consume "515" and write it out to the customer id column of the output.

Figure 2:
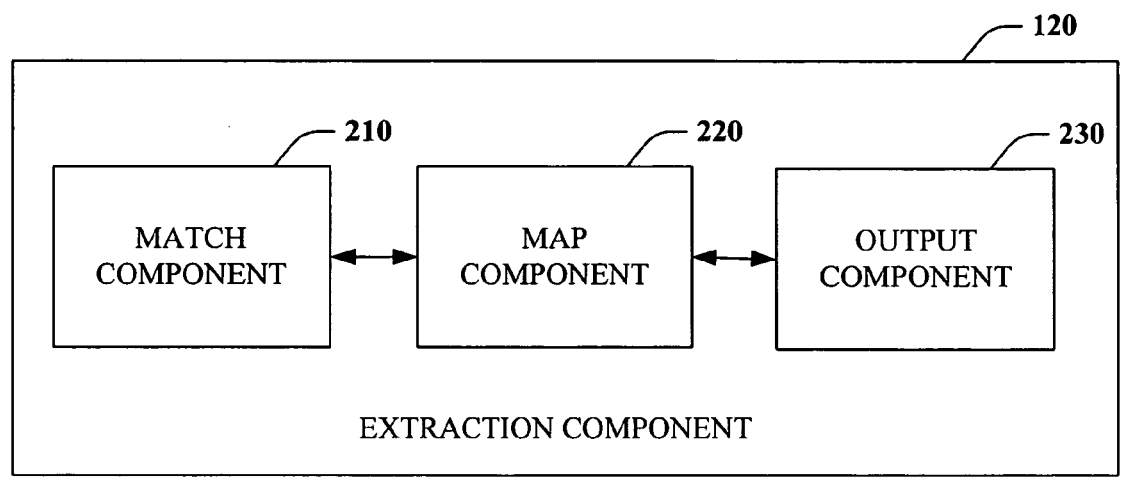
FIG. 2 is a block diagram of an extraction component.

FIG. 2 illustrates the extraction component 120 in further detail in accordance with an aspect of the subject innovation. As shown, the extraction component 120 can include match component 210, map component 220 and output component 220 communicatively coupled. The match component 210 can compare a specified pattern to source text utilizing any one or more algorithms known in the art and additionally produce pattern-matching data. The map component 220 receives or retrieves or otherwise accesses the pattern-matching data of the match component 210 and analyzes the data to identify portions or units thereof that are a subject of an associated annotation. For instance, data in specified range can be identified. In the previous example, this corresponds to a range of characters beginning with character 14 and terminating with a newline. The map component 220 can then transfer or make available the identified data units and related output locations to the output component 230. Upon receipt or retrieval of the data and location information the output component 230 is operable to copy or persist the data to its designated location. This can correspond to mapping data of a first structure or format to data of a second structure of format, such as from a flat file to a data warehouse table. It should be appreciated that the functionality provided by each of components 210, 220 and 230 can be performed concurrently such that as data is matched is its being copied to the designated location substantially simultaneously. In accordance therewith, many instances of the subject components can be instantiated and executed on a number of processors.

Figure 3:
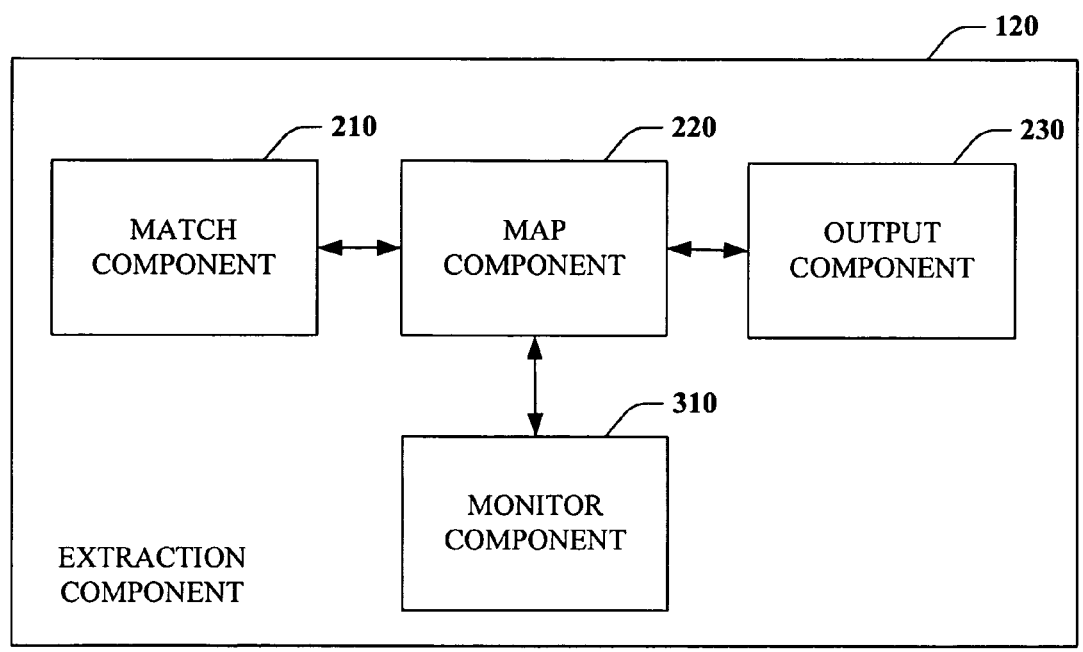
FIG. 3 is a block diagram of another extraction component including a monitor component.

FIG. 3 illustrates the extraction component 120 in accordance with yet another aspect of the subject innovation. Extraction component 120 includes match component 210, map component 220 and output component 230 as previously described. In brief, the match component 210 can identify data that matches a given pattern for example as specified by a regular expression. The map component 230 can identify subsections of the matched data identified by the pattern annotation, and output component 230 can copy the matched data to a designated location also specified by the pattern annotation. In addition, extraction component 120 can include a monitor component 310 communicatively coupled to the map component 210. The monitor component 310 is operable to identify and resolve problems pertaining to mappings. In particular, the monitor component 310 can employ knowledge of the data destination and/or source, historical data, and context information, among other things, to locate and fix problematic annotation mappings for example entered by manually be a user. Rules based logic and/or artificial intelligence based reasoning can be employed to detect and correct errors. For example, if a produce name of type string to be mapped to customer id of type integer, the monitor component 310 can identify the erroneous mapping and infer the correct mapping to product name. Alternatively, a user can be notified and provided a mechanism to fix the mapping.

Figure 4:
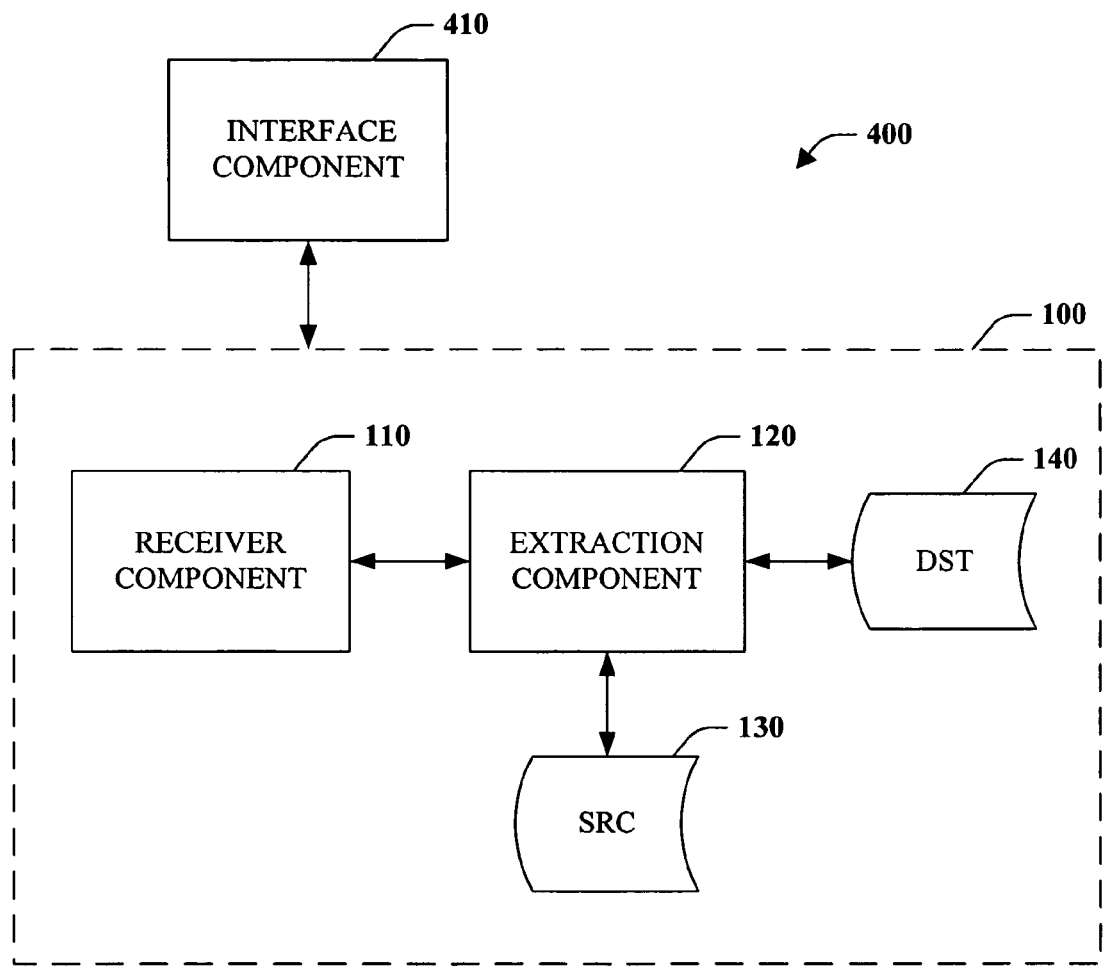
FIG. 4 is a block diagram of a data parsing system including an interface.

Turning attention to FIG. 4, a data parsing system 400 is illustrated in accordance with an aspect of the subject innovation. System 400 is comprised of system 100 of FIG. 1 and an interface component 410. The parsing system 100 provides a mechanism to match, map and transfer data to an output or destination. The system 100 comprises the receiver component 110, extraction component 120 as well as data source and destination 130 and 140, respectively. The interface component 410 facilitates interaction with the system 100. For example, the interface component 410 can be utilized to generate and provide annotated patterns. Additionally or alternatively, the user interface can provide a mechanism to receive and resolve process errors and the like. The interface component 410 can be but is not limited to being a graphical user interface (GUI). Additionally, the interface component 410 can correspond to an application programming interface (API) to facilitate interaction with system 100.

Figure 5:
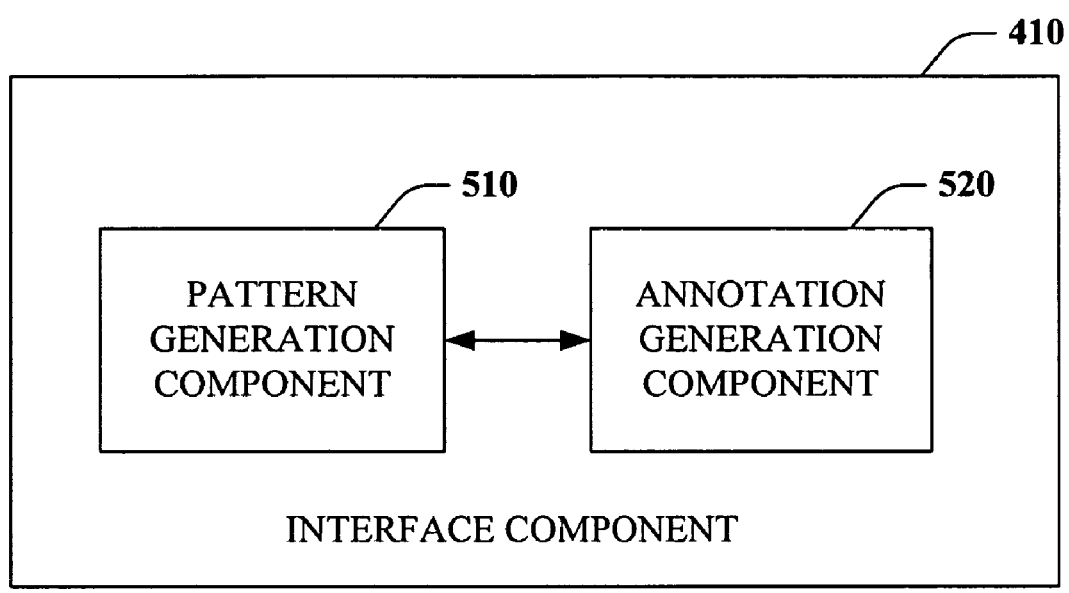
FIG. 5 is a block diagram of user interface that facilitates generation of annotated patterns.

FIG. 5 depicts the interface component 410 in accordance with one aspect of the innovation. As mentioned, the interface component 410 can be employed to facilitate generation of annotated patterns such as an annotated regular expression. In furtherance of such functionality, the interface component 410 includes a pattern generation component 510 and an annotation generation component 520. The pattern generation component 410 can provide mechanisms or tools to facilitate generation of a pattern. For example, a text box can be provided to receive a manually typed text pattern. Tools such as intelligent assistance or fill can be provided to assist patter specification. Additionally or alternatively, graphical elements may be provided to enable iterative construction of pattern. The annotation generation component 520 provides a mechanism to assist in generating and linking information to the pattern such as a list of output data field that result after a pattern has been matched and a mapping of each output data filed to a subsection of the pattern. Tools such a text boxes, intelligent assistance and the like can also be provided to assist a user in generating an annotation.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Furthermore, as will be appreciated, various portions of the disclosed systems above and methods below may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation monitor component 310 can employ such mechanisms to facilitate error detection and correction.

Figure 6:
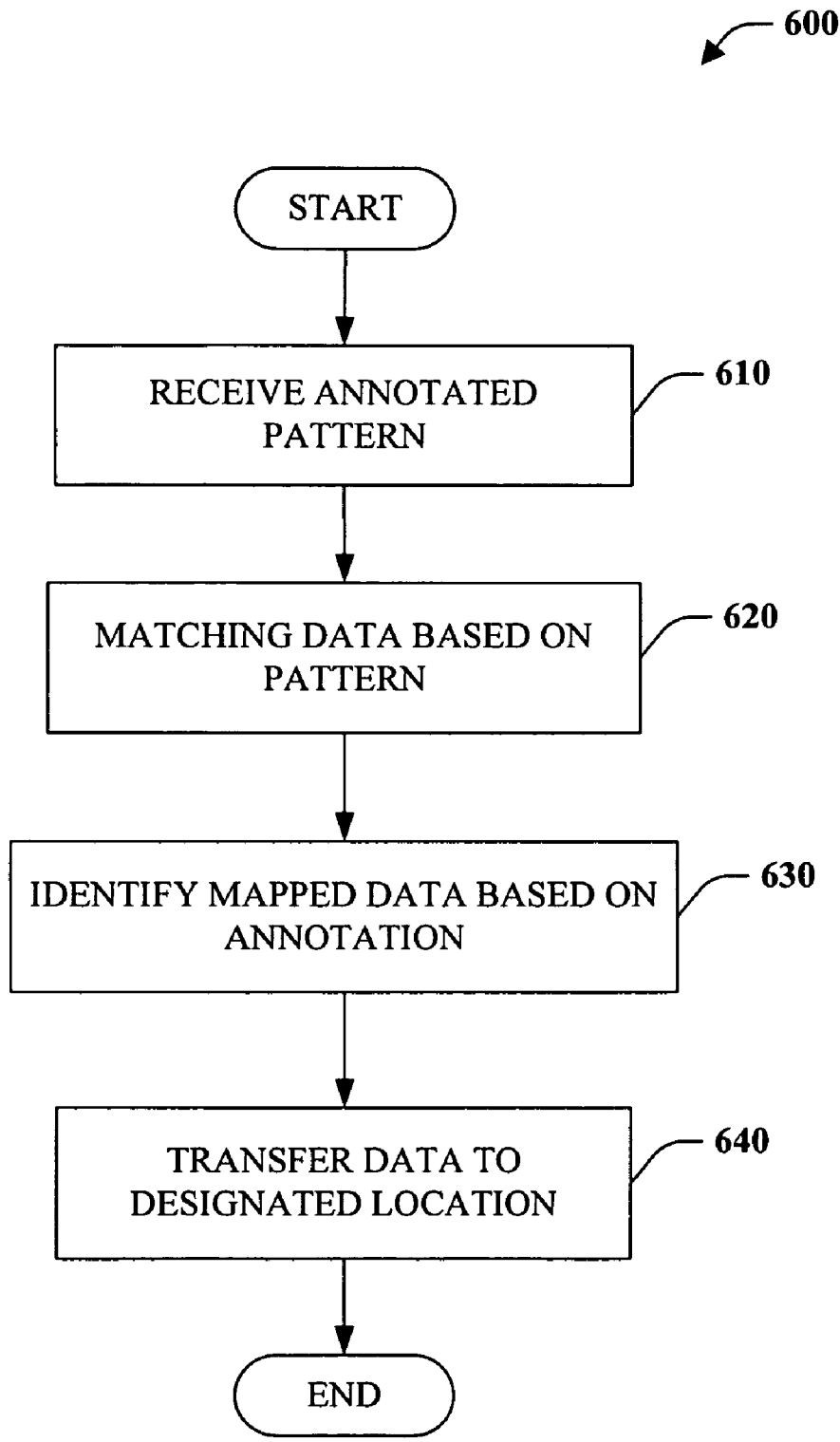
FIG. 6 is a flow chart diagram of a data parsing methodology.
Figure 7:
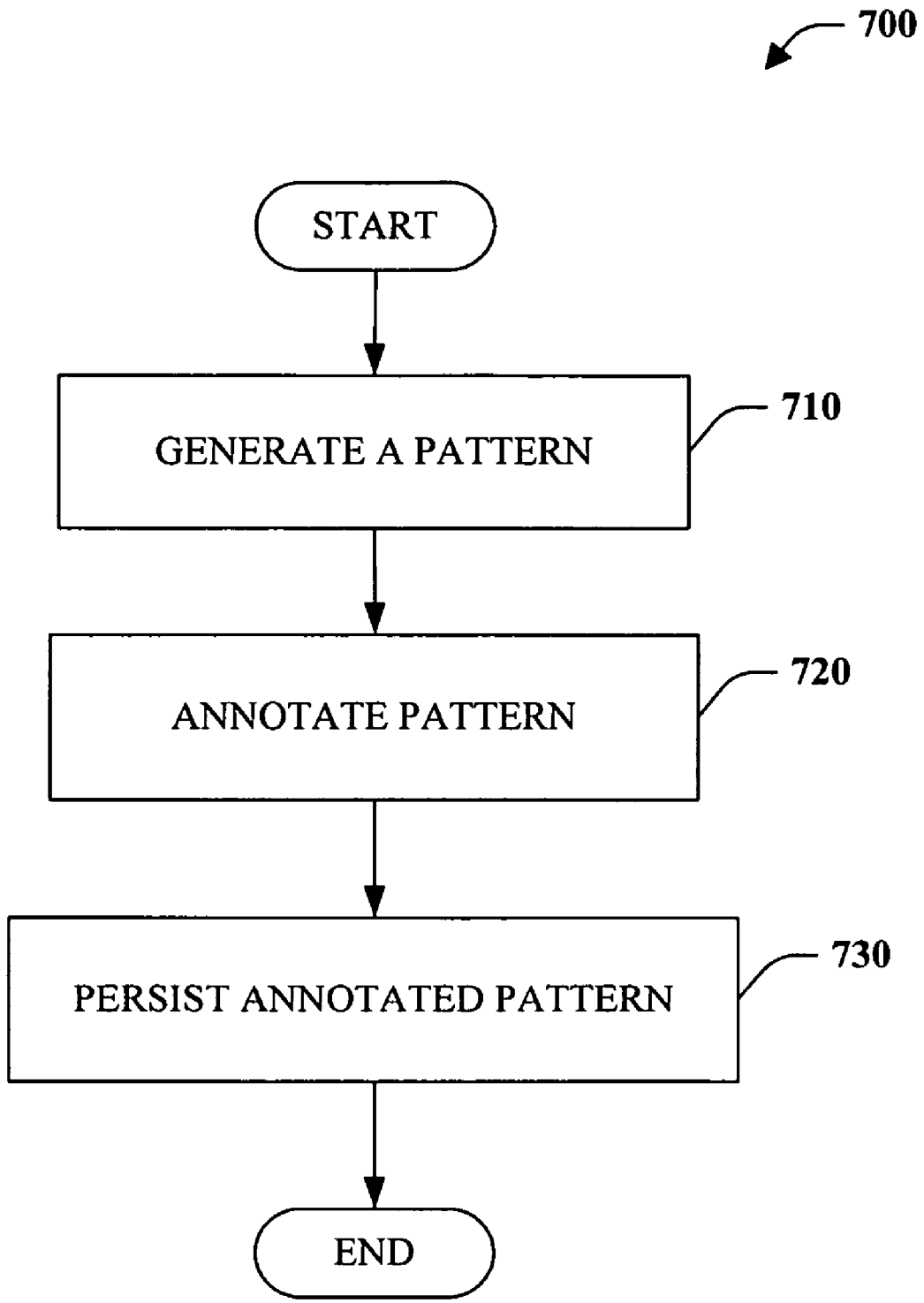
FIG. 7 is a flow chart diagram of a method designating data to be transferred.

In view of the exemplary systems described supra, methodologies that may be implemented in accordance with the disclosed subject matter will be better appreciated with reference to the flow charts of FIGS. 6 and 7. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning to FIG. 6, a data parsing method 600 is illustrated in accordance with an aspect of the subject invention. At reference numeral 610, an annotated pattern is received. As discussed supra, and as the name suggests, an annotated pattern includes both a pattern and an annotation. The pattern represents a text pattern that can be compared against data to identify matches. In one instance, the pattern can be identified by a regular expression; however, the invention is not limited thereto. The annotation provides additional information with respect to the pattern such as information regarding extraction of at least a portion of matched data. At numeral 620, matching data is identified based on a received pattern. The annotations are then analyzed to identify mapped data from the matching data at reference numeral 630. The mapped data can correspond to segments of the pattern-matched data. At 610, one or more mapped data segments are transferred or copied to the location designated by the annotation.

FIG. 7 is a flow chart diagram depicting a method 700 of designating data to be transferred in accordance with an aspect of the subject innovation. At reference numeral 710, a pattern is generated. The pattern corresponds to a text pattern that can be matched. The text pattern can be specified utilizing regular expressions or the like in accordance with an aspect of the innovation. At numeral 720, the pattern is annotated. In other words, information is added to the pattern to identify what matched data should be mapped and where. For example, if a pattern identifies customer first names and last names, the annotation can identify first name and map it to a first name column and last name and map it to a last name column. At reference numeral 730, the generated annotated pattern can be persisted to a computer readable medium. Subsequently, the annotated pattern can be retrieved and employed to process additional data of the same format.

As an example, an IT (Internet Technology) profession can generate annotated regular expressions associated with a file format, which they designed or with which they are familiar. For example, the file format can be associated with a transactional database or log. A novel parser, perhaps associated with a workflow system, can then employ the annotated expressions to populate a tabular database warehouse. More specifically, the parsing system can be associated with a workflow package and run daily or nightly to retrieve data from a transactional database and populate the data warehouse.

What follows are systems and methods that facilitate generation and interaction with annotated patterns. Note that while certain orientations of displaying information to users are shown and described with respect to certain figures, those skilled in the relevant art will recognize that various other alternatives can be employed. The pages, screens or dialog boxes are stored and/or transmitted as display descriptions, as graphical user interfaces, or by other methods of depicting information on a screen (whether personal computer, PDA, mobile telephone, or other suitable device, for example)

where the layout and information or content to be displayed on the page is stored in memory, database, or another storage facility.

Figure 8:
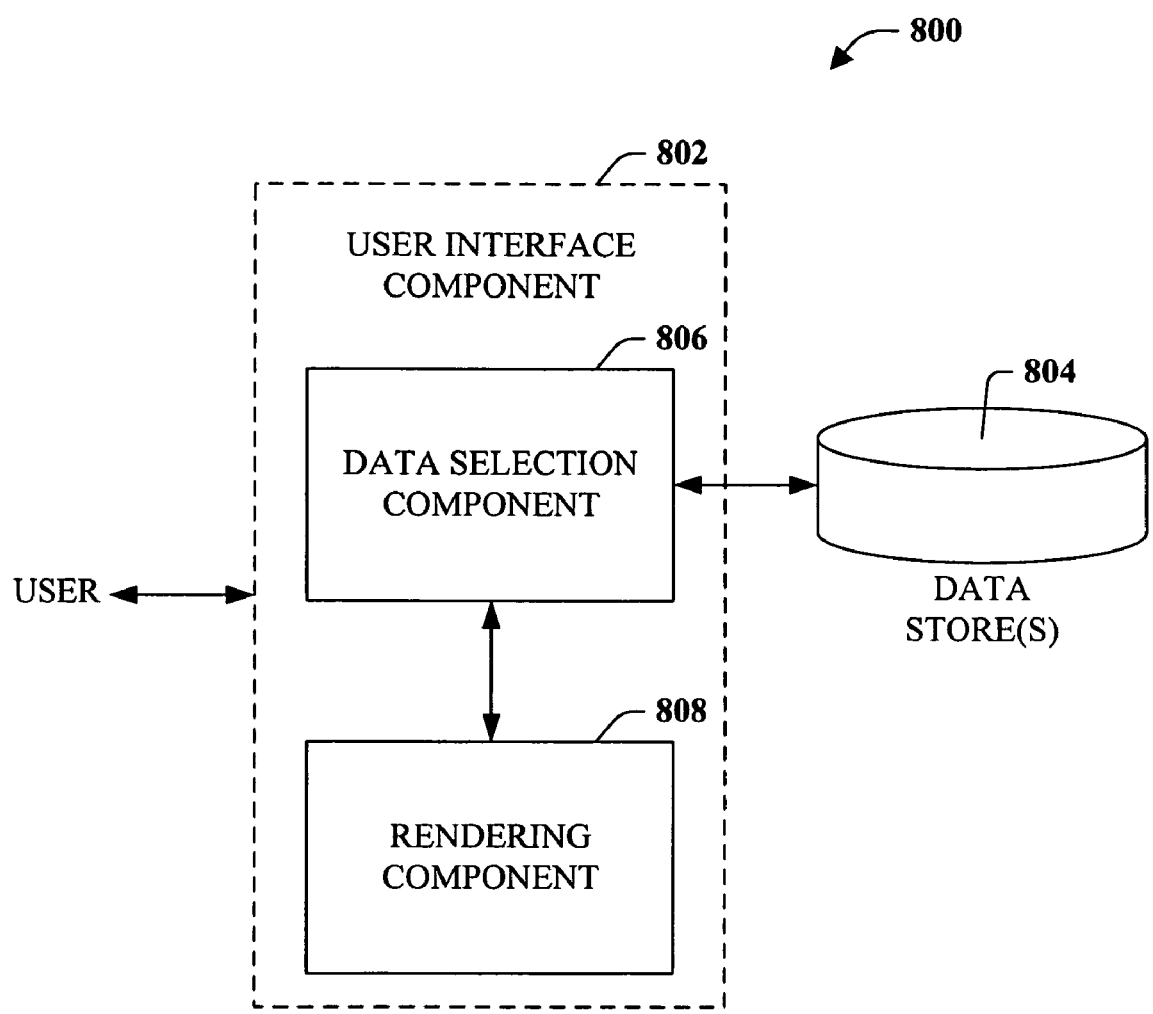
FIG. 8 is a block diagram of a system that facilitates design and annotation of a regular expression.

Referring to FIG. 8, a system 800 is depicted that facilitates visual design of a text pattern in accordance with an aspect of the innovation. Generally, system 800 can include a user interface (UI) component 802 that enables a user to design and implement a text pattern with respect to data maintained in a data store 804 in accordance with an aspect of the innovation. Although the system 800 illustrated in FIG. 8 depicts a single data store 804, it is to be understood and appreciated that the subject UI 802 can be employed to parse and extract data from any number of local or remote data stores, repositories and the like.

More particularly, the UI 802 can include a data selection component 806 and a rendering component 808. The data selection component 806 can aid a user with respect to graphic selection of data from the data store component 804. As will be better understood upon a review of the figures and discussion that follow, the data selection component 806 can be used in connection with the rendering component 808 to graphically render data, and selected subsets thereof, to a user.

In other words and in accordance with an aspect of the innovation, the rendering component 808 can graphically display all of the data, or any subset thereof, in accordance with a regular expression. The data selection component 806 can include one or more selection mechanisms (e.g., tools) by which a user can graphically select and/or identify data. In operation, a user can employ the data selection component 806 to select a subset of the data. In accordance therewith, the rendering component 808 can analyze the selection thereafter establishing a syntactical regular expression as well as a tabulated view of the data in accordance with the selection.

Additionally, to assist further in the formulation of a tabulated view of the text pattern, the data selection component 806 can help a user to distinctly mark portions of the syntactical regular expression. In accordance therewith, the rendering component 808 can dynamically render a graphical representation of the marked regular expression via a tabulated or column view. Stated differently, the regular expression can be annotated and the rendered data can be marked similarly in the graphical representation.

The subject innovation is directed to a novel mechanism that enables graphical design and generation of a regular expression. As well, another feature of innovation described herein is directed to a mechanism that can dynamically render data in a manner that assists in the establishment and interpretation of a regular expression.

As described above, the innovation can be particularly useful in parsing structured information. While the innovation can be used in connection with, and is described herein with reference to, data stored in a database, it is to be understood that the novel features of the innovation can be employed in connection with any type of structured data (e.g., flat files, XML).

As will be understood, there is a vast amount of data stored in text files that have different formats. By way of example, one company may have data stored in one format while another company has data stored in another format. A problem that exists is how to read that data and get it into a common database. Conventionally, a custom parser would have to be written to the desired format that is being read. Alternatively, a variety of flexible parsers could be employed where the metadata for a particular file format can be defined. To this end, in accordance with the metadata, the parser can read the data.

As such, a generalized parser can be employed that is driven by regular expressions that are annotated in a novel manner. Typically, a regular expression defined by a user is employed to match some amount of data. However, as described supra, knowledge of the specific data type's format as well as a specialized parser would have to be employed. In accordance with this innovation, a mechanism whereby a user can match an input stream to a regular expression while employing a set of annotations for the regular expression that map a region of the regular expression to a designated output column is disclosed.

Therefore, as the system parses and thereafter compares to the input stream, every time a character in the input stream matches the expression, the innovation can display what range of the expression the matching character falls into based upon the annotation(s). This graphical rendering is one of the novel features of the subject innovation.

Figure 9:
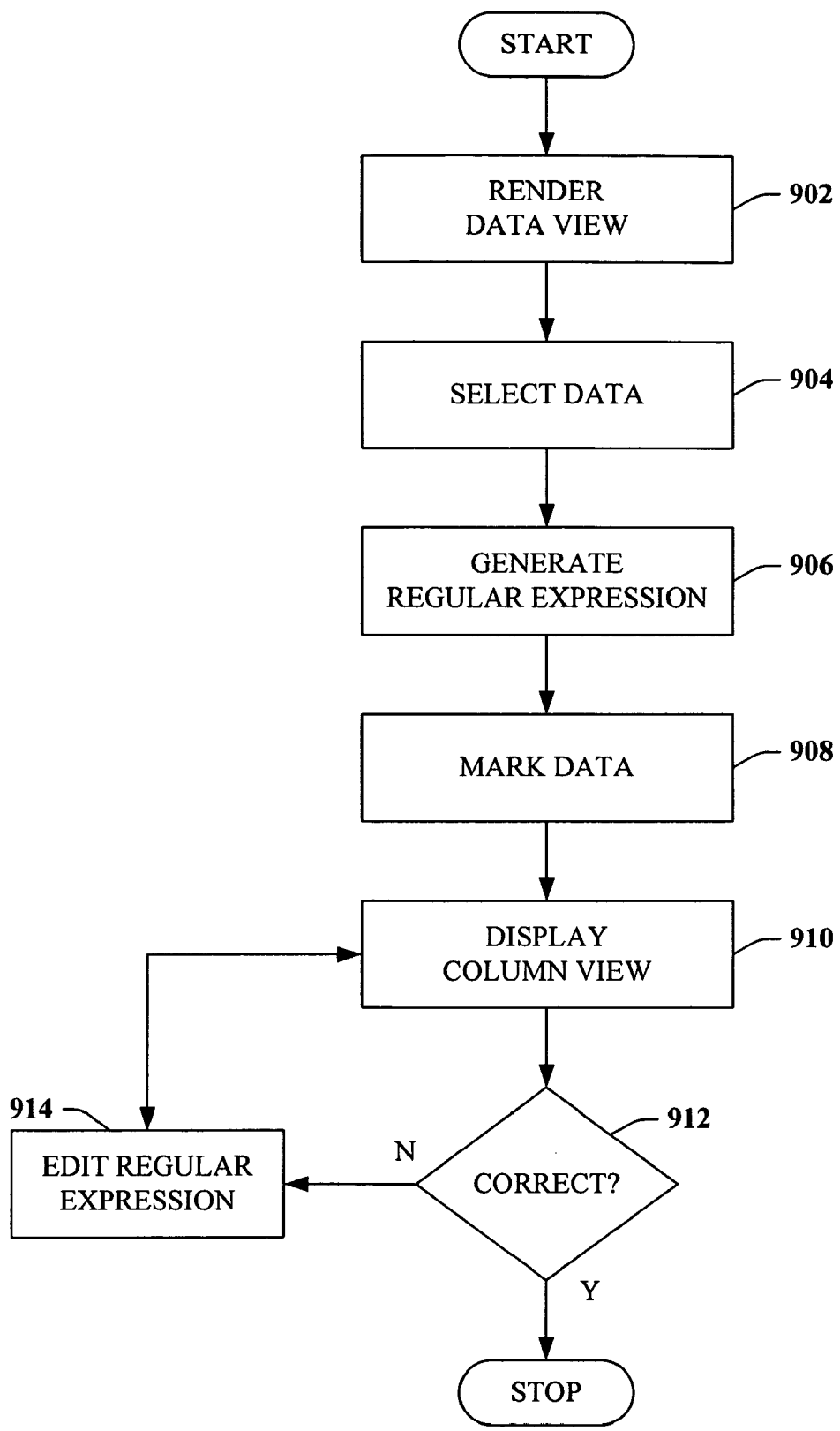
FIG. 9 is a flow chart diagram of procedures that facilitate designing a regular expression.

FIG. 9 illustrates a methodology of graphically displaying data based upon a regular expression in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At reference numeral 902, a data view can be rendered which represents all, or a subset, of data in a store or group of stores. It will be understood and appreciated that the data view can be rendered in any manner without departing from the novel functionality of the innovation. Accordingly, at 904, data can be selected from the graphical representation of the data. In disparate aspect, any mechanism known in the art can be employed to select the data.

By way of example, in one aspect, a mouse, touchpad or other navigational device can be employed in order to effectuate a data selection. Similarly, a keyboard, touch screen or the like can be employed to make a particular selection. It is to be understood by those skilled in the art that any selection mechanism can be employed in accordance with the novel functionality described herein. These alternative aspects are to be included within the scope of this disclosure and claims appended hereto.

Once data is selected at 904, a regular expression can be automatically generated at 906. This regular expression can be represented in the syntactical form in accordance with the selected data. In other words, this regular expression can be rendered for display to a user in a syntactical manner.

In accordance with the auto-generated regular expression, data can be rendered (e.g., displayed) that represents an output data set based upon application of the regular expression upon the complete data set. It will be appreciated that the aforementioned acts describe one novel feature of the innovation, graphical generation of a regular expression. As such, it will be appreciated that a user does not have to know the intricate syntax of regular expressions. Rather, the system can automatically generate a regular expression based upon a user data selection.

Another novel feature of the innovation is the ability to display an output of the regular expression when applied upon the complete data set. At numeral 908, desired portions of the syntactical rendition of the regular expression can marked in a conspicuous manner such that when the data is rendered, the rendered data is also marked in a similar conspicuous manner. In other words, this method of marking can assist a user to validate the system-generated regular expression.

By way of further example, at 910, an output of the data can be rendered in a table bearing the conspicuous markings. Once rendered, a user can compare the rendered output to the system-generated regular expression. To this end, at 912, a determination can be made if the output represents the desired data.

If at numeral 912, the data does not represent the desired data, the syntactical regular expression can be manually edited at 914. Accordingly, the output data can dynamically update in accordance with any user-defined edits as illustrated. As shown, this process can be iterative until the user reaches the desired output data. Thus, the syntactical regular expression can be generated without knowledge of the intricate syntax of regular expressions. On the other hand, if at 912, the data does represent the desired data, this is an indication that the syntax of the system-generated regular expression is correct and a stop block is reached.

Figure 10:
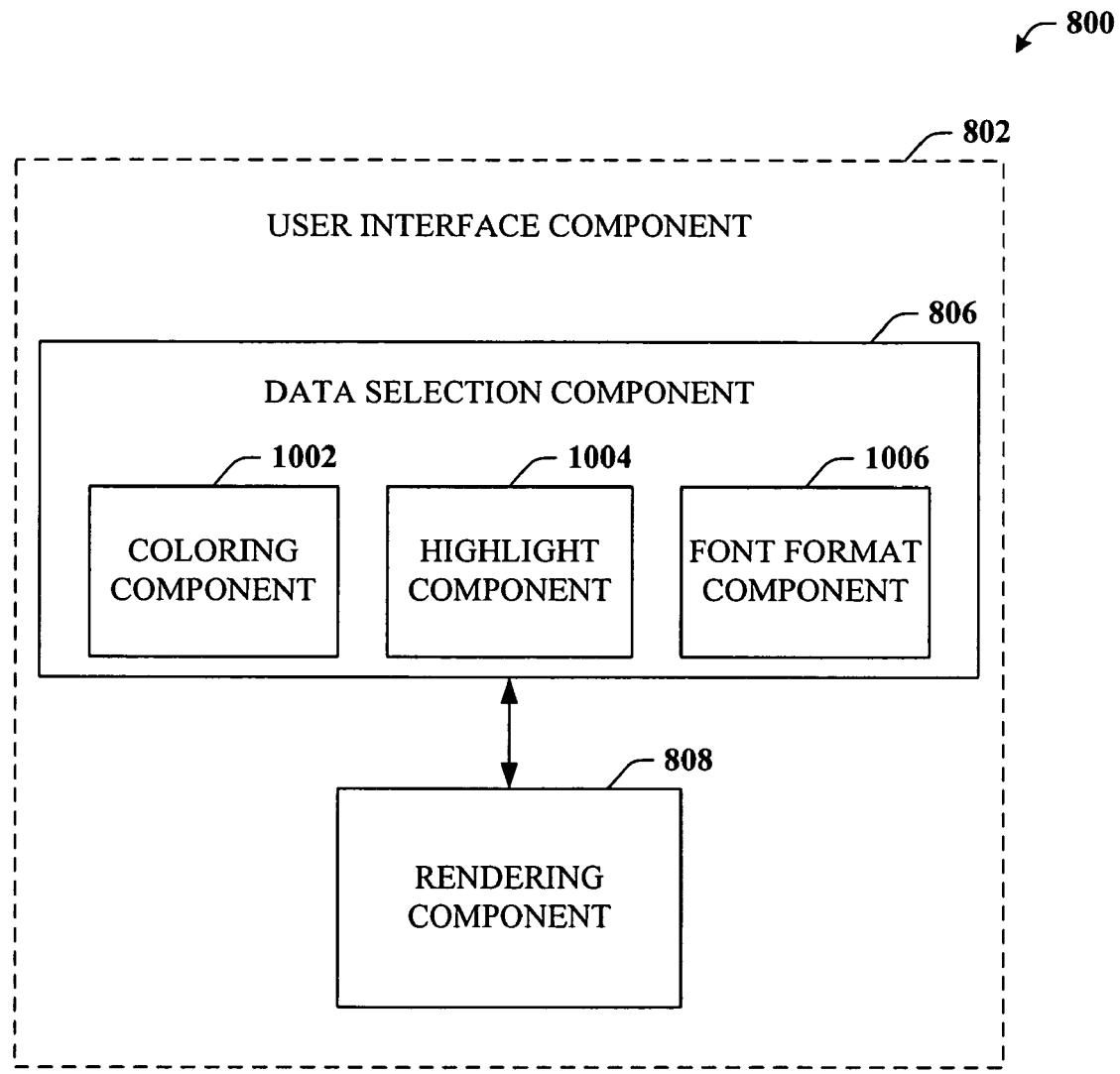
FIG. 10 is a block diagram of a system that employs various mechanisms that facilitate annotation.

Referring now to FIG. 10, an alternative architectural block diagram of system 800 is shown in accordance with an aspect of the innovation. More particularly, FIG. 10 illustrates three exemplary sub-components of data selection component 806. These three sub-components can facilitate marking of data (and/or regular expression syntax). Although particular marking sub-components are shown in FIG. 10, it is to be understood and appreciated that additional marking options exist and are to be included within the scope of the innovation described herein. To this end, these additional marking sub-components are to be included within the scope of this disclosure and claims appended hereto.

As shown in the exemplary block diagram of FIG. 10, data selection component 806 can include a coloring component 1002, a highlighting component 1004 and a font format component 1006. In operation, each of these sub-components can be employed to conspicuously annotate data and/or segments of a regular expression. By way of example, conspicuous annotation of the regular expression can enable the system render tabulated data that employs the identical conspicuous markings. In other words, the conspicuous annotations can effectively map or link a portion of the regular expression to some subset of the data.

In another example, an annotation sub-component (e.g., 1002, 1004 and 1006) can be employed to annotate or re-annotate data such that the system-generated regular expression can be updated/modified accordingly. As described supra, this novel annotation scheme can assist a user in graphically establishing an accurate regular expression of a particular data subset.

Figure 11:
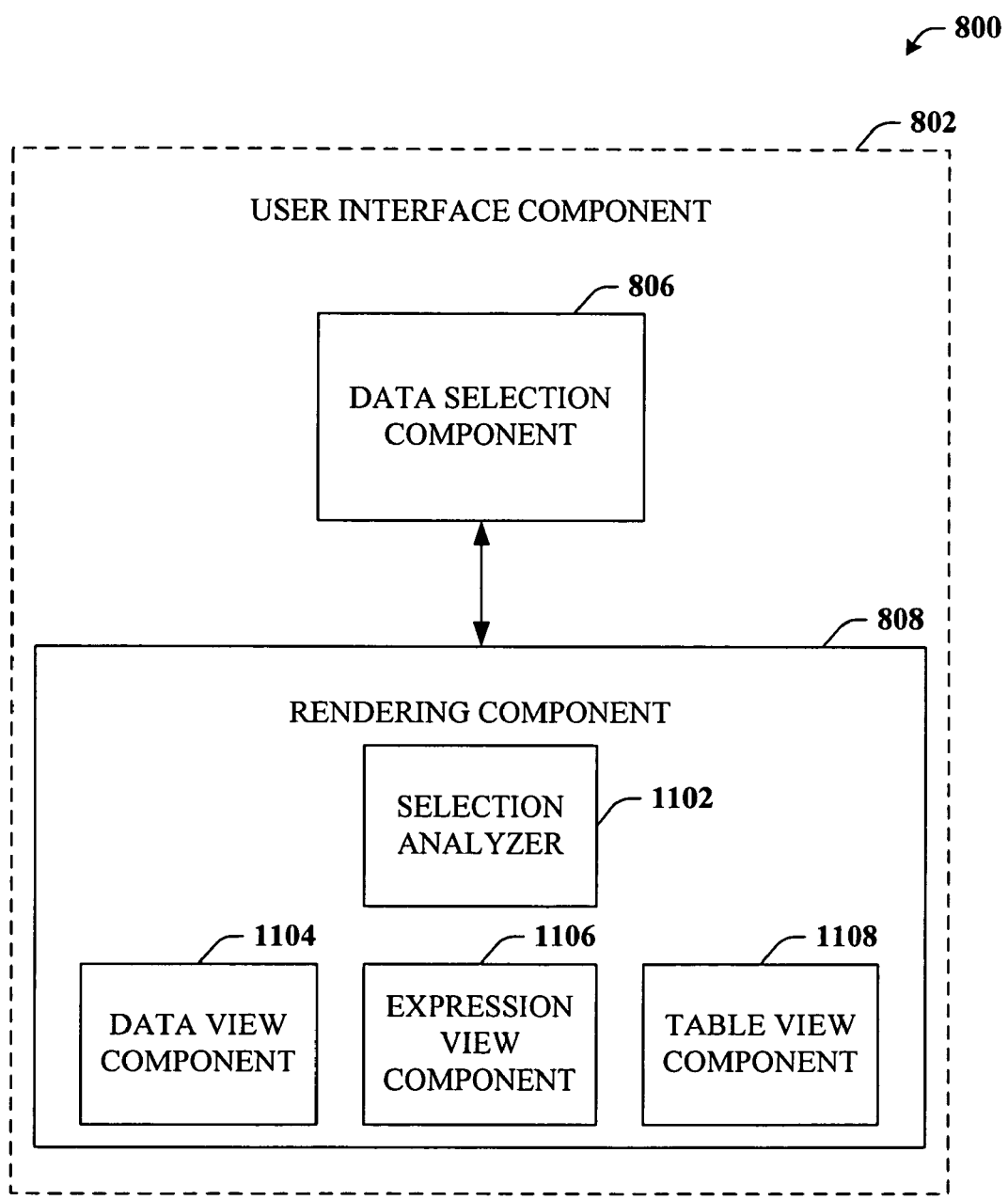
FIG. 11 is a block diagram of a system that employs various mechanisms for rendering data.

Referring now to FIG. 11, yet another alternative architectural diagram of system 800 is shown. Specifically, FIG. 11 illustrates that rendering component 808 can include a number of sub-components that effect rendering data in accordance with a regular expression. Generally, in accordance with the aspect illustrated, rendering component 808 can include an analyzer component 1102, a data view component 1104, an expression view component 1106, and a table view component 1108. Each of these components will be described in greater detail below. As well, FIG. 12 that follows illustrates an exemplary graphical UI display in accordance with an aspect of the innovation.

As described above, a user can make a selection of data from a data view. For example, a user can use a navigation device, touch screen, stylus, keyboard or the like to make a desired data element selection. Once selected, an analyzer component 1202 can be employed to analyze the selection and thereafter automatically generate a system-generated regular expression.

The data view component 1104 can be employed to graphically render a view of a specified or determined data store or collection. The expression view 1106 can be employed to display the syntactical regular expression generated via the analyzer component 1102. Additionally, the table view component 1108 can be employed to represent conspicuously annotated data in a tabulated format.

In operation, once a pattern is annotated, the system can follow the directions of the annotation, as described supra. For example, the annotation can direct the system to write a particular character, or group of characters, to an output column.

In sum, the subject innovation discloses a system and methodology to visually, via a UI, design, create and implement annotated regular expressions. Additionally, the subject innovation discloses a novel UI that can be employed to simplify the generation, modification and/or verification of these novel regular expression annotations.

Figure 12:
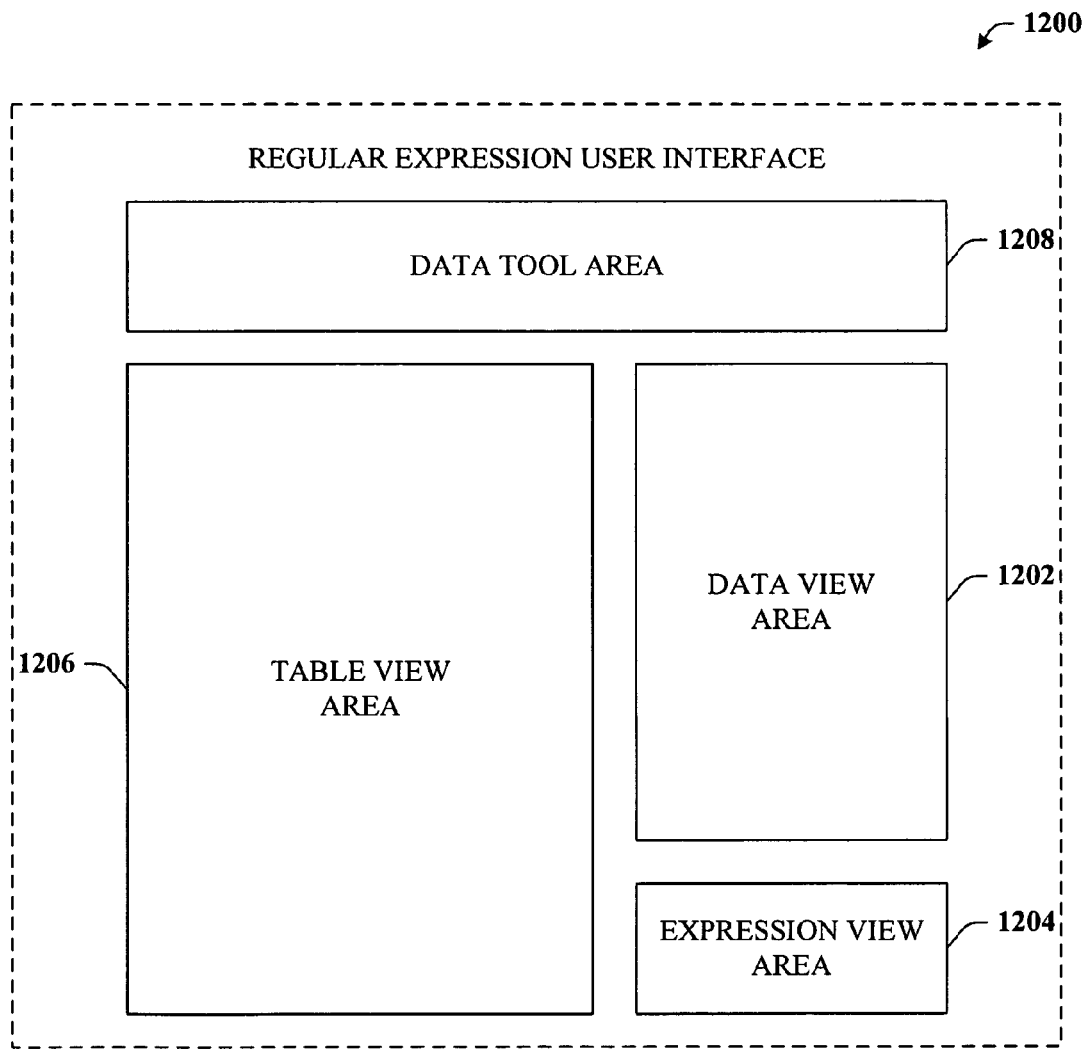
FIG. 12 illustrates an exemplary user interface graphical display orientation.

FIG. 12 illustrates an exemplary graphical representation 1200 of a UI display in accordance with an aspect of the innovation. As shown, the graphical representation 1200 can include disparate predefined regions within the display. Although a specific orientation is illustrated in FIG. 12, it is to be understood that this orientation is included to provide perspective to the innovation and is not intended to limit the innovation in any way. It will be appreciated that other orientations exist that include a subset of the information shown as well as other orientations that include information in addition to that shown in FIG. 12. In any case, these alternative aspects are to be included within the scope of this disclosure and claims appended hereto.

As shown in FIG. 12, the graphical UI can include a data view area 1202, an expression view area 1204 and a data view area 1202. Each of these areas has been described in detail supra. In summary, each of these areas can be dynamic with respect to the others. By way of example, as data is selected within the data view area 1202, the expression view area 1204 can be dynamically updated to reflect a system-generated regular expression that corresponds to the selected data.

Similarly, as the regular expression is updated and/or modified in the expression view area 1204, the table view area 1206 can likewise be dynamically updated. Moreover, as annotations are applied to the regular expression in the expression view area 1204, these annotations can be dynamically rendered within the table view area 1206, and vice-versa.

As shown in FIG. 12, the exemplary UI can also include a data selection tool area 1208. More particularly, this data tool area 1208 can be employed to render a graphical link to data tools including but, not limited to, selection and annotation tools (e.g., coloring, highlighting).

As will be understood, this UI can be very intuitive and can make it easy for a user to generate regular expression and to employ annotations associated therewith. In other words, the novel UI can enable a user to generate and verify a regular expression without knowing the underlying syntax of the regular expression. One way that this novel UI can be employed is by presenting a user with a visual representation as shown in FIG. 12.

Following are a few examples of the novel features of the innovation. These examples are provided in order to add context to the innovation and are not intended to limit the innovation in any way. As described above, within the graphical dialog box 1200, the UI can employ several panels (e.g., areas). For example and as described above in greater detail, one panel can be a data panel 1202 that represents a data view. In accordance therewith, a user can make a selection of particular text represented within the data view. Once selected, a user can apply an annotation (e.g., marking, color) to the selected text.

In this example, the coloring can serve to distinguish ranges. Upon interpreting data in a text file, the data can be first divided into a number of rows. Continuing with the example, a user could first select all of the text that represents a particular row. Next, the data can be annotated and the annotation can be uniquely marked. It is to be understood and appreciated that forms of marking, including but not limited to font characteristics (e.g., bold, italics, underline, size) or other highlighting or coloring can be employed without departing from the spirit and/or scope of the innovation. These alternative marking mechanisms are to be included within the scope of this disclosure and claims appended hereto.

In operation and continuing with the example, a user can employ any hierarchical marking where the widest marking of level one is effected first. Within, this level one marking, the user can then select additional text that can represent individual columns. These individual columns can also be marked (e.g., colored) as desired. In other words, column one can be one color, column two can be another and so on. As these markings are made in the data view, an expression view can display a system-generated syntactical regular expression that potentially matches the range outlined via the visual selections.

By way of more specific example, suppose a user has a text file that represents the text for a book, in this example, the user can make a selection of any desired text from the data view that represents all of the text included within the book. Continuing with the example, the user can select the first word and the space after that word. Thus, the system can automatically generate a regular expression that matches the expression.

In accordance therewith, one expression the system would generate could be an asterisk followed by a space, for example, "*_". It will be understood that this regular expression can yield any number of characters followed by a space when applied to a data set. Further, if this regular expression is applied to the file, it would yield rows with one column where the single column would be of a string type and each row would include an instance of a single word.

In another example, a user can select two words and a space. Accordingly, the system would interpret this selection and present a potential regular expression (e.g., "*_*_") in the expression view area. When applied to the file, a result in two word strings would be generated, for example, the first row would be the first two words, the second two words would be the second row and so forth.

Here, in the expression, there are two ranges, the first asterisk "*" and the second asterisk "*." As described above, the innovation can facilitate application of annotations within this regular expression. In accordance with the novel functionality of the innovation, these annotations can be applied via a novel UI as described herein. In other words, the innovation can enable graphical creation of a mapping of the sub-expressions to an output column.

Returning to the example of the regular expression "*_*_", the two *'s can be considered the sub-expressions. Therefore, within the UI a third control can be employed that shows the output column control (e.g., table view area). In accordance therewith, a user can click and drag a selection from the data view or from the expression view to an output column view or list. Thus, a linkage can be established thereby annotating the regular expression with respect to a particular output column. In other words, the annotation can define that a particular selection of the regular expression is in fact data for an output column. The particular output column can be defined by where the sub-expression is dragged within the column view.

Additionally, the novel UI can include additional controls that enable adding and/or removing output columns. As well, controls can be provided that enable setting the types of the output columns. Other UI controls can be employed to further enhance the novelty and usefulness of the UI described herein. These additional controls will be understood by those skilled in the art and are to be included within the scope of this disclosure and claims appended hereto.

One novel feature of the innovation is the actual graphical depiction of the data, which enables a user to visually interpret the data with respect to a regular expression. Another novel feature of the innovation is the graphical rendering of the regular expression as well as the establishment of the syntactical regular expression within the expression view. Accordingly, a user can prompt an interpretation of how a regular expression will apply to all of the rows in a data view.

It will be appreciated that an error can be generated if the system-established regular expression is not correct. Accordingly, the system will enable a user to manually modify the system-generated regular expression as desired. Once a user changes the expression syntax within the expression view, the coloring within the data view will dynamically change in accordance with the modifications. In other words, once selections are changed in the data view, the expression within the expression view dynamically changes. Similarly, if a change is manually made to the syntax within the expression view, the data view automatically updates to match.

In summary, as described in detail above, the innovation provides a user with a graphical tool that facilitates design of a regular expression. As will be understood, regular expressions are sometimes difficult for even the most experienced computer savvy users. Oftentimes a reference must be on hand to know all of the available characters available within the syntax of regular expressions. As well, oftentimes, repetitive testing is required in order to reach a desired output data set in accordance with the regular expression. Thus, the innovation simplifies this complexity by enabling any user to graphically generate regular expressions while dynamically viewing results in accordance with selections.

In other words, the system can render a graphical view that identifies parts of the data (e.g., text) that match parts of the regular expression. With reference again to the example above, if the regular expression is "*_*_", each "*" can be marked in a unique manner (e.g., color). As such, the text in the output would be colored in accordance with the coloring. In the example, suppose the first * is red, and the second * is blue. In accordance therewith, the output would represent a red word followed by a blue word throughout.

Furthermore, suppose that the system-generated regular expression does not yield the desired output. Rather, suppose the user would prefer to achieve a tabulated output with two words followed by a single word. Accordingly, the regular expression could be modified to be "*_*_*_" where the first two *'s can be marked with red and the third can be marked with blue. In accordance therewith, the output would show two red words mapped to a first column followed by a blue word mapped to another column throughout. It will be understood that this modification can be made either within the syntactical view of the of the expression view or graphically within the data view (e.g., by coloring two words red followed by a blue word).

Figure 13:
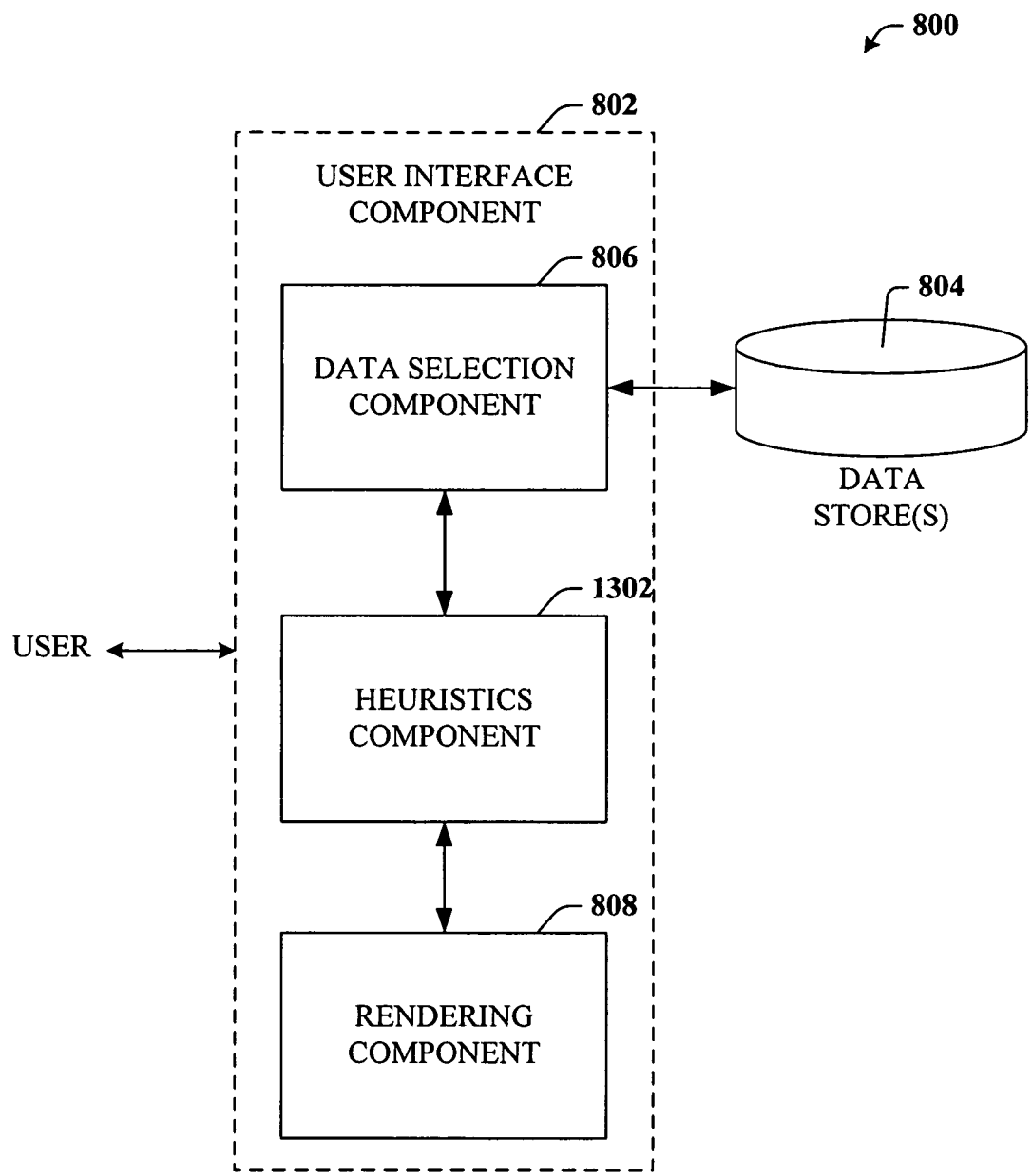
FIG. 13 is a block diagram of an architecture including a heuristics component that can automate functionality.

Referring now to FIG. 13, yet another alternative system 1300 that facilitates graphical authoring of a regular expression is depicted in accordance with an aspect of the innovation. As shown, system 1300 can include a heuristics component 1302 that can automate one or more features of the innovation. More particularly, the heuristics component 1302 can automate one or more features of the system 1300 based at least in part upon historical, probabilistic, and/or statistical analysis. In operation, the heuristics component 1302 can facilitate logic and/or reasoning (e.g., artificial intelligence (AI)) in order to automate one or more novel features of the innovation.

Figure 14:
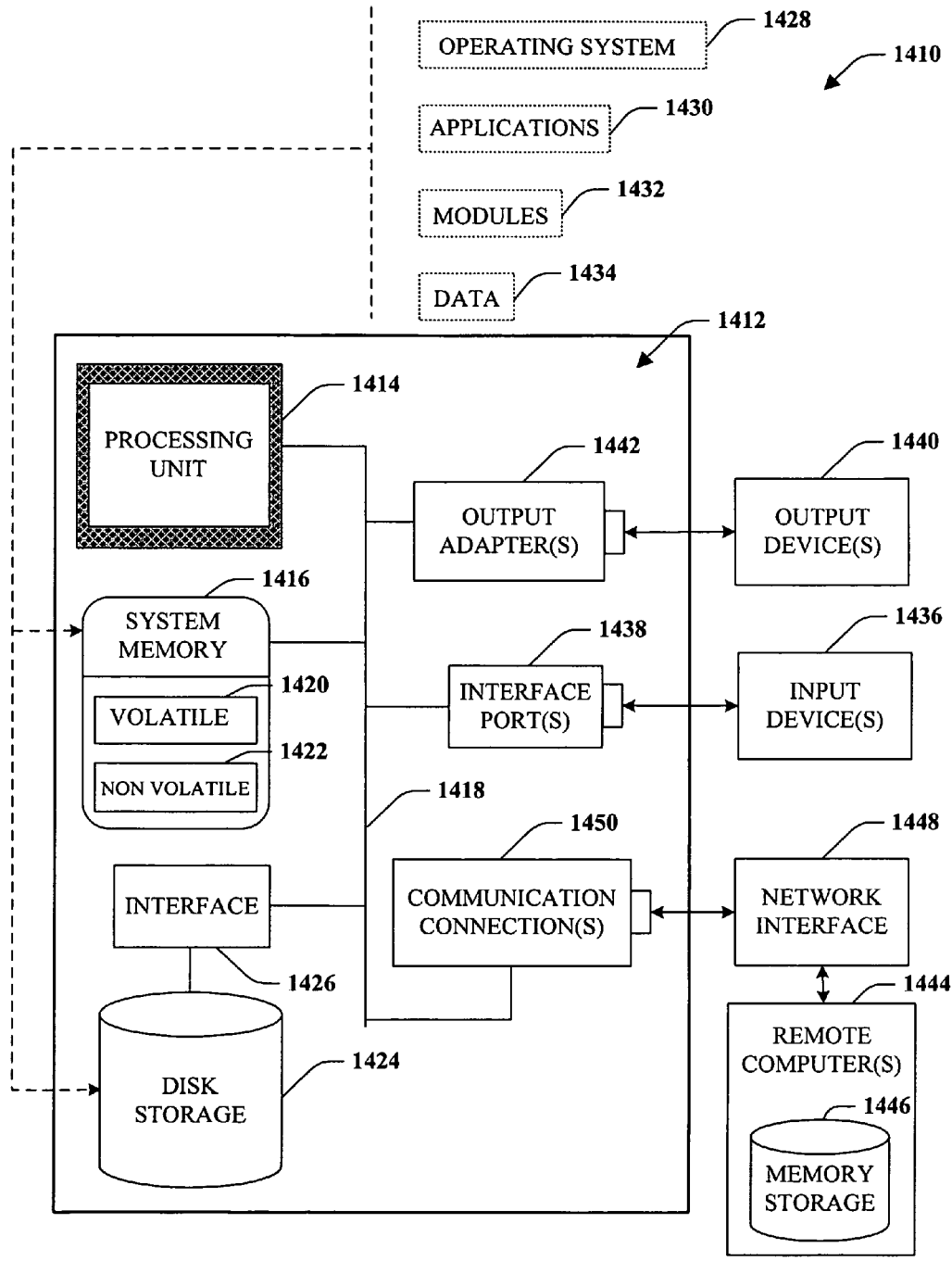
FIG. 14 is a schematic block diagram illustrating a suitable operating environment for aspects of the subject innovation.
Figure 15:
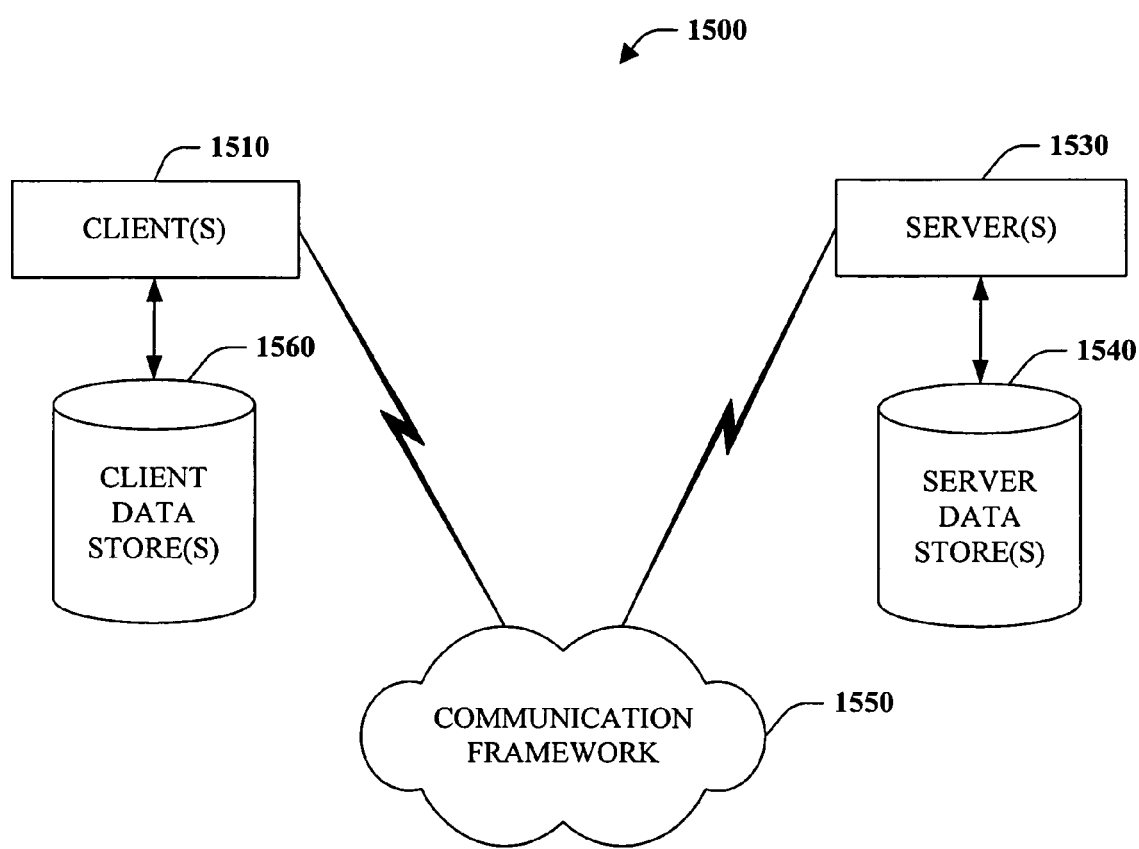
FIG. 15 is a schematic block diagram of a sample-computing environment.

In order to provide a context for the various aspects of the disclosed subject matter, FIGS. 14 and 15 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, handheld computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 14, an exemplary environment 1410 for implementing various aspects disclosed herein includes a computer 1412 (e.g., desktop, laptop, server, hand held, programmable consumer or industrial electronics . . . ). The computer 1412 includes a processing unit 1414, a system memory 1416, and a system bus 1418. The system bus 1418 couples system components including, but not limited to, the system memory 1416 to the processing unit 1414. The processing unit 1414 can be any of various available microprocessors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/non-removable, volatile/non-volatile computer storage media. FIG. 14 illustrates, for example, disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the present invention can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412 and to output information from computer 1412 to an output device 1440. Output adapter 1442 is provided to illustrate that there are some output devices 1440 like displays (e.g., flat panel and CRT), speakers, and printers, among other output devices 1440 that require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s)

1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1416, it can also be external to computer 1412. The hardware/software necessary for connection to the network interface 1448 includes, for exemplary purposes only, internal and external technologies such as, modems including regular telephone grade modems, cable modems, power modems and DSL modems, ISDN adapters, and Ethernet cards or components.

FIG. 15 is a schematic block diagram of a sample-computing environment 1500 with which the subject innovation can interact. The system 1500 includes one or more client(s) 1510. The client(s) 1510 can be hardware and/or software (e.g., threads, processes, computing devices). The system 1500 also includes one or more server(s) 1530. Thus, system 1500 can correspond to a two-tier client server model or a multi-tier model (e.g., client, middle tier server, data server), amongst other models. The server(s) 1530 can also be hardware and/or software (e.g., threads, processes, computing devices). The servers 1530 can house threads to perform transformations by employing the subject innovation, for example. One possible communication between a client 1510 and a server 1530 may be in the form of a data packet transmitted between two or more computer processes.

The system 1500 includes a communication framework 1550 that can be employed to facilitate communications between the client(s) 1510 and the server(s) 1530. The client(s) 1510 are operatively connected to one or more client data store(s) 1560 that can be employed to store information local to the client(s) 1510. Similarly, the server(s) 1530 are operatively connected to one or more server data store(s) 1540 that can be employed to store information local to the servers 1530.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A data parsing system comprising a memory having stored therein the following computer executable components:
   a receiver component that receives a pattern annotated with one or more output data fields in which data of different file format types is to be stored, the pattern being annotated by a user to include one or more portions of additional information;
   a matching component that identifies data in a data source that is to be extracted in accordance with the user's annotation, wherein the data includes data units of a plurality of different data file formats, the matching component being configured to match the received pattern with data units of a selected data file format type and return at least a portion of pattern-matching data;
   a mapping component that accesses and analyzes the pattern-matching data to identify one or more portions thereof that match the user annotation; and
   an extraction component that extracts data units of the selected data file format type from the data source using the annotated pattern and the mapped pattern-matching data, wherein the data extraction occurs simultaneously while the data is being matched with the received pattern and transfers the extracted data, during extraction of the data, to at least one location defined by the one or more output data fields, and wherein the data matching, data mapping and data extraction occur simultaneously.

2. The system of claim 1, further comprising a monitor component that identifies one or more erroneous data transfers.

3. The system of claim 2, wherein the extraction component notifies a user of an erroneous annotation mapping and enables the user to correct the erroneous annotation mapping.

4. The system of claim 2, wherein the one or more erroneous data transfers comprise erroneously transferring one data type to a location representing another data type.

5. The system of claim 3, wherein the extraction component corrects an erroneous annotation mapping by inferring a correct annotation mapping.

6. The system of claim 1, wherein the annotated pattern is an annotated regular expression.

7. The system of claim 6, wherein at least a portion of the extracted data corresponds to a range of characters of the regular expression.

8. The system of claim 1, further including an interface component that enables a user to graphically generate the annotated pattern using a graphical user interface.

9. The system of claim 8, wherein the interface component enables the user to map the annotated pattern to one or more parts of a tabulated output.

10. The system of claim 9, wherein the one or more parts of the tabulated output comprise one or more columns, wherein the pattern matches a row of text, and wherein the one or more output data fields specify population of the one or more columns.

11. The system of claim 10, wherein the one or more output data fields associates at least one of a first, a last, or a middle name with the one or more columns.

12. The system of claim 1, wherein the at least one location is a data warehouse.

13. The system of claim 12, wherein the data is extracted from text contained in a file.

14. A data extraction method associated with instructions stored in a memory and performed by a processor, wherein the method comprises:

provyding a visual interface both for designing a regular expression and for annotating the regular expression, such that a user can map the regular expression to a particular tabulated output;

receiving at the visual interface user input including regular expression annotation information configured to annotate the regular expression with information that associates one or more output locations with one or more parts of the regular expression;

identifying data stored in a computer-readable medium that matches the annotated regular expression, wherein the data stored in the computer-readable medium includes data units of a plurality of different file format types and at least a portion of pattern-matching data;

matching the annotated data pattern with data units of a selected data file format type;

mapping the pattern-matching data to one or more identified portions that match the user annotation;

extracting the identified data of the selected data file format type from the computer-readable medium using the annotated pattern and the mapped pattern-matching data, wherein the data extraction occurs simultaneously while the data is being matched with the annotated regular expression, and wherein the data matching, data mapping and data extraction occur simultaneously; and storing the identified data in the one or more output locations based on the annotated information.

15. The method of claim 14, further comprising copying the identified data to a data warehouse.

* * * * *

UNITED STATES PATENT AND TRADEMARK OFFICE
CERTIFICATE OF CORRECTION

| | | |
|---|---|---|
| PATENT NO. | : 7,860,881 B2 | Page 1 of 1 |
| APPLICATION NO. | : 11/371449 | |
| DATED | : December 28, 2010 | |
| INVENTOR(S) | : J. Kirk Haselden et al. | |

It is certified that error appears in the above-identified patent and that said Letters Patent is hereby corrected as shown below:

On the title page, item (57), under "ABSTRACT" column 2, lines 1-2, before "A mechanism" delete "The subject disclosure pertains to data parsing with patterns or regular expressions.".

On the title page, in item (57), under "ABSTRACT" column 2, line 9, delete "exacted" and insert -- extracted --, therefor.

On title page 2, in item (56), under "Other Publications" column 2, line 25, below "Nov. 24, 2009, Office Action." insert -- U.S. Appl. No. 11/356,383, Aug. 19, 2010, Office Action. --.

Signed and Sealed this
Twenty-sixth Day of July, 2011

David J. Kappos
*Director of the United States Patent and Trademark Office*